(12) United States Patent  (10) Patent No.: US 9,038,902 B2
Yun  (45) Date of Patent: May 26, 2015

(54) ELECTRONIC DEVICE FOR RECOGNIZING ERRONEOUS INSERTION OF CARD, AND OPERATING METHOD THEREOF

(71) Applicant: Samsung Electronics Co., Ltd., Gyeonggi-do (KR)

(72) Inventor: Yong-Sang Yun, Gyeonngi-do (KR)

(73) Assignee: Samsung Electronics Co., Ltd., Samsung-ro, Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 14/091,557

(22) Filed: Nov. 27, 2013

(65) Prior Publication Data

US 2014/0203081 A1 Jul. 24, 2014

(30) Foreign Application Priority Data

Jan. 21, 2013 (KR) .................. 10-2013-0006605

(51) Int. Cl.
*G06K 7/00* (2006.01)
*G06K 7/10* (2006.01)
*H01R 13/641* (2006.01)
*H01R 12/72* (2011.01)
*G06K 7/06* (2006.01)
*G06K 13/08* (2006.01)

(52) U.S. Cl.
CPC .......... *G06K 7/10851* (2013.01); *H01R 13/641* (2013.01); *H01R 12/721* (2013.01); *G06K 7/065* (2013.01); *G06K 13/0825* (2013.01); *G06K 7/0008* (2013.01); *G06K 7/0021* (2013.01); *H04B 1/3816* (2013.01)

(58) Field of Classification Search
USPC .......................... 235/436, 437, 486, 483, 482
See application file for complete search history.

(56) References Cited

U.S. PATENT DOCUMENTS

| 5,877,975 | A | * | 3/1999 | Jigour et al. ..................... 365/52 |
| 6,226,189 | B1 | | 5/2001 | Haffenden et al. |
| 2008/0298006 | A1 | | 12/2008 | Kim et al. |
| 2010/0011283 | A1 | | 1/2010 | Wray |
| 2011/0039442 | A1 | | 2/2011 | Kim |
| 2012/0083316 | A1 | | 4/2012 | Lee et al. |
| 2012/0252240 | A1 | | 10/2012 | Yang |
| 2013/0012070 | A1 | | 1/2013 | Uesaka et al. |
| 2013/0102169 | A1 | * | 4/2013 | Simpson et al. .............. 439/147 |

FOREIGN PATENT DOCUMENTS

| EP | 2 360 622 A1 | 8/2011 |
| JP | 63-149191 A | 6/1988 |
| JP | 6-155974 A | 6/1994 |
| JP | 7-28959 A | 1/1995 |
| JP | 10-255910 A | 9/1998 |

(Continued)

*Primary Examiner* — Karl D Frech
(74) *Attorney, Agent, or Firm* — Cha & Reiter, LLC.

(57) ABSTRACT

An electronic device comprises a socket having a plurality of connection terminals that accommodates a card-type external device having a corner cut-out portion, a plurality of contact pads exposed on a surface of the card-type external device that are correspondingly connected to the connection terminals in response to insertion of the card-type external device into the socket. A detection unit detects erroneous insertion of the card-type external device into the socket in response to incorrect location of the cut-out portion during the erroneous insertion. A processor outputs a control signal in response to the detected erroneous insertion of the card-type external device.

20 Claims, 11 Drawing Sheets

(56) References Cited

FOREIGN PATENT DOCUMENTS

| JP | 11-85915 A | 3/1999 |
|---|---|---|
| JP | 11-155004 A | 6/1999 |
| JP | 11-232404 A | 8/1999 |
| JP | 2001-244023 A | 9/2001 |
| JP | 2003-317872 A | 11/2003 |
| JP | 2004-318635 A | 11/2004 |
| KR | 10-2005-0011933 A | 1/2005 |
| KR | 10-2008-0106728 A | 12/2008 |

* cited by examiner

ELECTRONIC DEVICE FOR RECOGNIZING ERRONEOUS INSERTION OF CARD, AND OPERATING METHOD THEREOF

CLAIM OF PRIORITY

This application claims priority under 35 U.S.C. §119 to an application filed in the Korean Intellectual Property Office on Jan. 21, 2013 and assigned Serial No. 10-2013-0006605, the contents of which are incorporated herein by reference.

TECHNICAL FIELD

The present disclosure concerns an electronic device for recognizing erroneous insertion of a card.

BACKGROUND

A known electronic device comprising a mobile communication terminal (e.g., a smart phone) includes a large screen touch-type display device and a high pixel resolution camera lens assembly to capture still pictures and moving pictures in addition to supporting a basic communication function. In addition, the mobile communication terminal plays back multimedia content such as music and moving pictures and connects to a network for web surfing. A known mobile communication terminal is equipped with a high-performance CPU and performs various advanced functions. A known mobile communication terminal is coupled to external devices selectively or mandatorily for particular functions using miniaturized external devices and associated interfaces. For example, a memory card external device expands storage space and a subscriber identification module card (so-called a "SIM" card) external device is detachably mounted such that a plurality of users requiring different authentication may use one electronic device. A SIM card external device is implemented as a type of card to facilitate use with a mobile communication terminal and to minimize needed mounting space. The SIM card is mounted in a socket within the device through an external port disposed at a selected location to enable access to mobile communication.

A SIM card stores subscriber information of a mobile communication terminal as well as system related information and is used for a CDMA type and other types of mobile wireless terminal. A SIM card is mounted in an electrical socket having a plurality of contact pads with predetermined size. A SIM card has a cut-out portion formed by cutting out one corner portion to guide a user in correct insertion of the SIM card into a terminal. A SIM card has easily recognized contact pads on one surface facilitating correct insertion of a card. However, since a SIM card is miniaturized and difficult to pick up by hand, a user may insert the SIM card into a socket in an erroneous opposite direction ignoring the cut-out portion of the SIM card, preventing operation of the mobile communication terminal or, causing malfunction. In addition, it becomes difficult for a user to separate a small SIM card from a socket for correct re-insertion. A system according to invention principles addresses these deficiencies and related problems.

SUMMARY

A system according to invention principles provides an electronic device recognizing erroneous insertion of a card in advance, identifying the incorrect insertion to a user regardless of insertion direction and operating method and preventing the malfunction of the electronic device.

An electronic device (e.g. a mobile communication terminal) comprises a socket having a plurality of connection terminals that accommodates a card-type external device having a corner cut-out portion, a plurality of contact pads exposed on a surface of the card-type external device that are correspondingly connected to the connection terminals in response to insertion of the card-type external device into the socket. A detection unit detects erroneous insertion of the card-type external device into the socket in response to incorrect location of the cut-out portion during the erroneous insertion. A processor outputs a control signal in response to the detected erroneous insertion of the card-type external device.

In a feature, the detection unit comprises a movable piece occupying the cut-out portion when the card-type external device is normally inserted into the socket, a fixed piece spaced apart from the moveable piece at a predetermined interval and a spring configured to support the moveable piece in occupying the cut-out portion and being supported by the fixed piece. The moveable piece is provided with a conductor, the fixed piece is provided with a first terminal and a second terminal spaced apart from each other and the first terminal and the second terminal are electrically connected to each other by the conductor in response to movement of the movable piece. The movable piece is pushed when the card-type external device is erroneously inserted such that the conductor electrically connects the first terminal and the second terminal of the fixed piece to detect erroneous insertion of the card-type external device. A display device outputs an error message guiding correct insertion of the card-type external device, in response to the detected erroneous insertion of the card-type external device.

In a further feature, a switching unit switches between electrical signals present on the connection terminals of the socket corresponding to the electrical signals of the contact pads of the card-type external device that is erroneously inserted, in response to the detected erroneous insertion of the card-type external device. The switching unit is switched automatically in response to the detected erroneous insertion of the card-type external device and a control signal from the processor. The card-type external device is a Subscriber Identification Module (SIM) card or a memory card.

In a further feature, the detection unit comprises at least one photo sensor performing detection by using the cut-out portion of the card-type external device to pass light for correct insertion detection. A first photo sensor detects whether there is a cut-out portion and a second photo sensor detects whether the card-type external device is inserted.

In another feature, a method detects erroneous insertion of a card-type external device into a socket of an electronic device by determining whether the card-type external device having a cut-out portion formed in a corner of the card-type external device and a plurality of contact pads exposed on a surface of the card-type external device for corresponding connection with connection terminals of the socket, is erroneously inserted, by detecting erroneous insertion of the card-type external device into the socket in response to incorrect location of the cut-out portion during the erroneous insertion. The method outputs an error message indicating the erroneous insertion, in response to the detected erroneous insertion of the card-type external device and terminates operation of the electronic device, in response to the detected erroneous insertion of the card-type external device.

In a further feature, the method determines whether the card-type external device is usable without correctly inserting the card-type external device and in response to the determination the card-type external device is usable without re-insertion, switches between electrical signals of the connection terminals of the socket corresponding to the electrical signals of the contact pads of the card-type external device that is erroneously inserted, in response to the detected erroneous insertion of the card-type external device. In response to the determination the card-type external device is erroneously inserted, the method switches between electrical signals of the connection terminals of the socket corresponding to the electrical signals of the contact pads of the card-type external device that is erroneously inserted. Where the card-type external device comprises a Subscriber Identification Module (SIM) card or a memory card and comprising switching between electrical signals of the connection terminals of the socket to provide correct corresponding SIM card or memory card electrical signals to corresponding circuit destinations.

BRIEF DESCRIPTION OF THE DRAWINGS

The above features and advantages of the present invention will become more apparent from the following detailed description when taken in conjunction with the accompanying drawings in which.

DETAILED DESCRIPTION

Exemplary embodiments of the present invention will be described herein below with reference to the accompanying drawings. For the purposes of clarity and simplicity, detailed descriptions of well-known functions or configurations will be omitted as they would unnecessarily obscure the subject matters of the present invention. Also, the terms used herein are defined according to the functions of the present invention. Thus, the terms may vary depending on users' or operators' intentions or practices. Therefore, the terms used herein should be understood based on the descriptions made herein.

In the following description, a mobile terminal is described as an electronic device, and a card-type external device applicable to the mobile terminal is illustrated and described below. However, the present invention is not limit thereto, and the card-type external device may be applicable to various types of apparatuses. For example, the card-type external device may be applied to a portable electronic device, and may be applicable to a portable terminal, a mobile pad, a media player, a tablet computer, a watch, a handheld computer, or a Personal Digital Assistant (PDA). However, various fixed electronic devices, such as a personal computer may have a structure which the card-type external device may be inserted into, even if it is not the portable electronic device.

In addition, the present invention describes a subscriber identification module (SIM) card as the card-type external device, but is not limited thereto. For example, various cards may be applicable to the electronic device, which have a plurality of contact pads to correspondingly connect to a plurality of connection terminals of a socket provided within the electronic device. Accordingly, it is apparent that various card-type external devices, such as a small memory card and an ID card may be applicable to the electronic device in addition to the SIM card.

Figure 1:
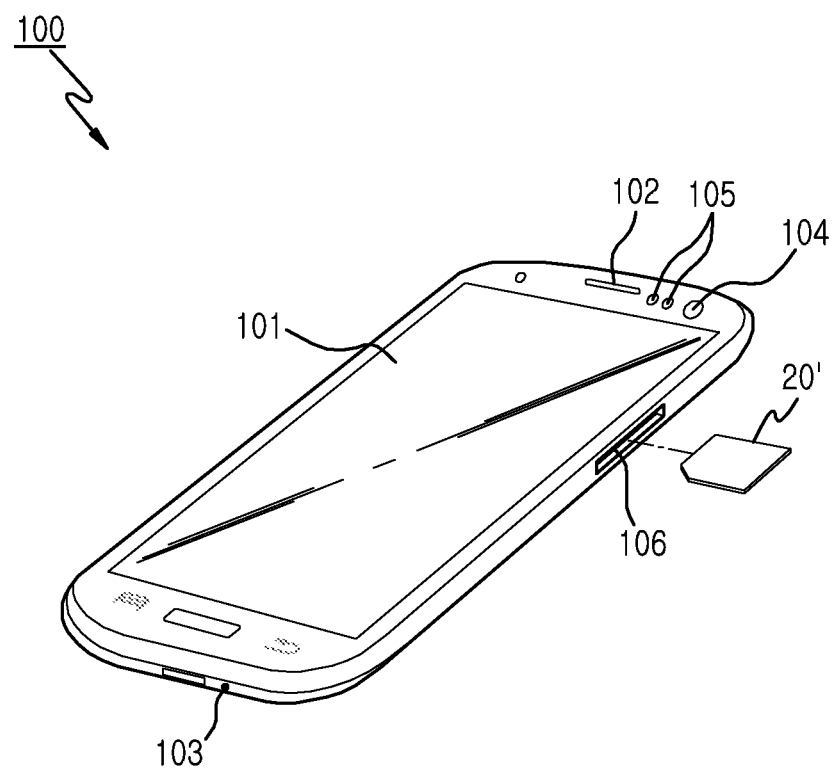
FIG. 1 shows a perspective view illustrating insertion of a SIM card into an electronic device according to principles of the invention.

FIG. 1 shows a perspective view illustrating insertion of a SIM card into an electronic device 100. Device 100 includes a front display device 101 comprising a touch screen, for example. A microphone device 103 for voice transmission is located below the display device 101, and a speaker device 102 for voice reception is located above the display device 101. A plurality of supplementary units 104 and 105 are provided around the speaker device 102 including a camera module 104 for photographing a subject, an illuminance sensor 105 for automatically adjusting the screen brightness of the display device 101, and a proximity sensor 105 for automatically inactivating the display screen during a call.

Slot 106 having a predetermined length is formed in a side of the electronic device 100 for accommodating a selectively insertable and retrievable card-type external device 20'. External device 20' may be a memory card used as a supplementary storage device of the electronic device or a SIM card, for example. Although not illustrated, a socket for accommodating the card-type external device 20' is provided inside the slot 106.

Figure 2:
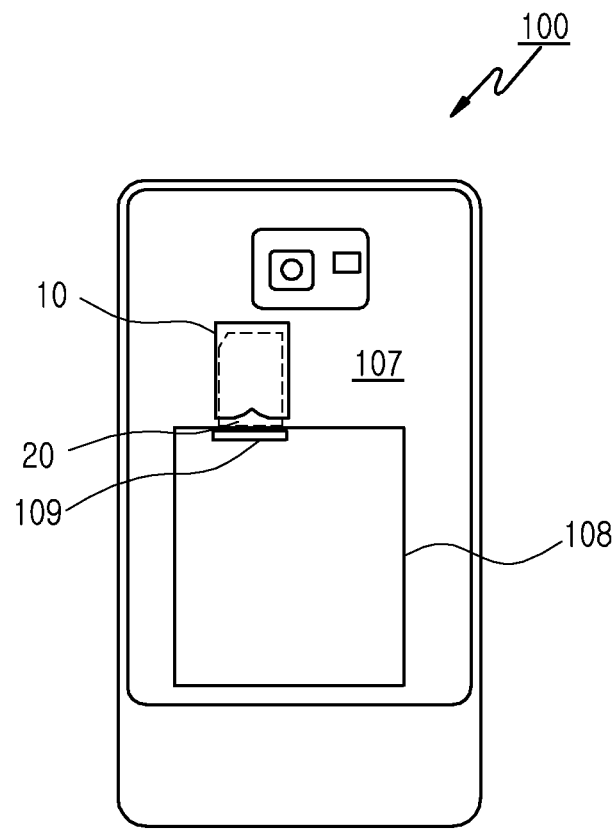
FIG. 2 shows a plan view illustrating insertion of a SIM card into an electronic device according to principles of the invention.

FIG. 2 shows a plan view illustrating insertion of a SIM card into electronic device 100 where a card-type external device 20 is mounted on a rear surface of the electronic device 100. Socket 10 accommodating device 20 is located in the rear surface 107 of the electronic device 100. External device 20 comprises a SIM card, for example, that is prevented from being detached by a battery pack 108 and a locking piece 109. A plurality of visually recognizable contact pads are located on the outside each of the card-type external devices 20' and 20 for physical electrical connection to corresponding connection terminals of the socket and it is not common for a user to insert the card in an overturned state. A system advantageously detects erroneous card insertion and guides a user in correct card insertion for normal SIM card operation in the case that a SIM card, typically having a rectangular shape, is erroneously inserted in reverse with a 180 degree orientation error.

Figure 3A:
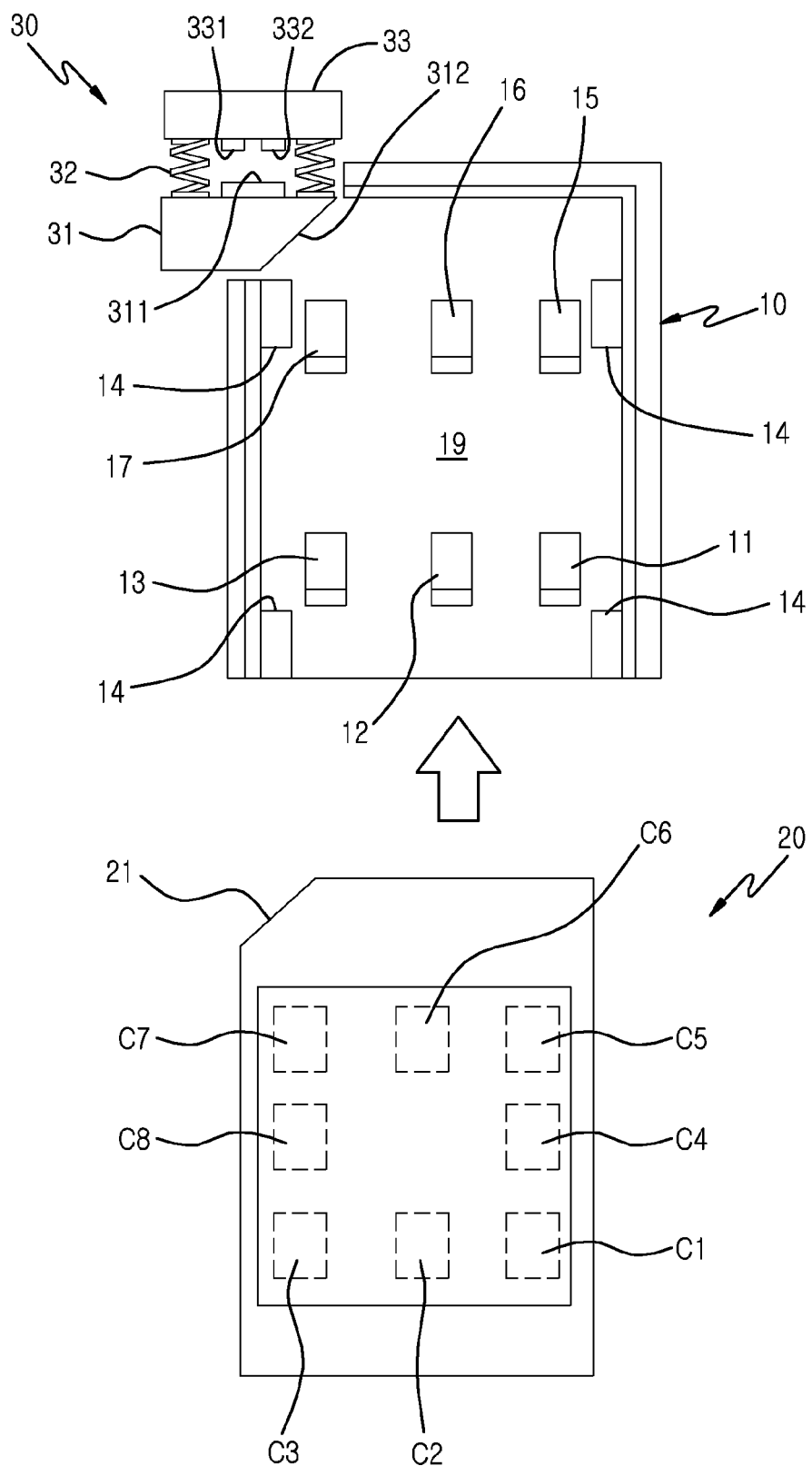
FIGS. 3A and 3B are diagrams illustrating a card normally inserted into a socket of an electronic device according to principles of the invention.
Figure 3B:
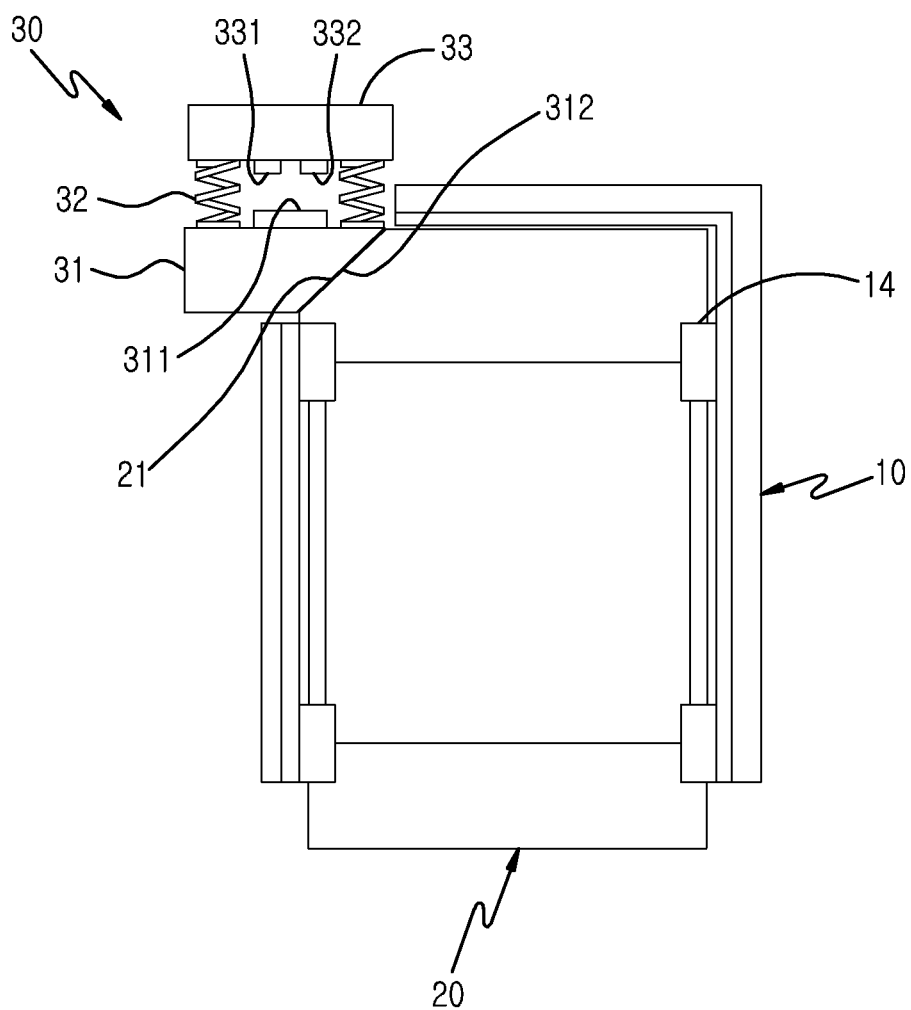

In the following description, the card-type external device is referred to as a 'SIM card' but the invention is not limited thereto. FIGS. 3A and 3B are diagrams illustrating a card normally inserted into a socket of an electronic device. SIM card 20 is normally inserted to the socket 10 and detection unit 30 located at the end of the socket 10 detects the insertion of the SIM card 20. The SIM card 20 has a general rectangular shape with a cut-out portion in one corner. Therefore, a user may recognize the cut-out portion 21 with the naked eye, and perform correct insertion of the SIM card 20. The SIM card 20 include a plurality of contact pads C1, C2, C3, C4, C5, C6, C7, and C8 which are exposed outside the SIM card at predetermined intervals. The contact pads C1, C2, C3, C4, C5, C6, C7, and C8 comprise, for example, configured by five contact pads SIM_VCC(C1), SIM_RST(C2), SIM_CLK (C3), SIM_GND(C5) and SIM_IO(C7) in the case of a SIM card. The remaining contact pads C4, C6 and C8 do not perform a separate connection function and are reserved for additional connection functions.

Corresponding socket connection terminals 11, 12, 13, 14, 15, 16, and 17 are provided in the card mounting space 19 of the socket 10. When SIM card 20 is mounted in the card mounting space 19 of the socket 10, the connection terminals 11, 12, 13, 15, 16, and 17 are correspondingly electrically connected to the five contact pads SIM_VCC(C1), SIM_RST (C2), SIM_CLK(C3), SIM_GND(C5) and SIM_IO(C7). At least one connection terminal (a "reserved pin") 16 is connected to the contact pad of the SIM card but does not perform a function. In addition, a plurality of locking pieces 14 along the rim of the socket 10 prevent the SIM card mounted in the card mounting surface 19 from being detached. The socket 10 may be formed in a type of housing, or may include a known locking device that is locked and released alternately when the mounted SIM card 20 is inserted in a mounting direction and retrieved, respectively.

The detection unit 30 occupies a portion of the card mounting space 19 of the socket 10 for detection of erroneous insertion of SIM card 20. The detection unit 30 includes a physically moveable piece 31 that moves outside the card mounting space 19 and a fixed piece 33 that supports a spring 32 which provides restoring force for moving moveable piece 31 in a direction towards card mounting space 19. Therefore, a part of the moveable piece 31 is within the card mounting space 19 of the socket 10 and returned by the spring 32 supported by the fixed piece 33. The moveable piece 31 is arranged to avoid interference with cut-out portion 21 of SIM card 20 when it is completely and correctly inserted and when the SIM card 20 is erroneously inserted without the cut out being in the correct location, the SIM card corner that is not cut out, comes into contact with the moveable piece 31. Moveable piece 31 is moved by the (non-cut out) corner of the SIM card when the SIM card 20 is completely erroneously inserted in the socket 10.

In addition, a ground pin 331 and a contact pin 332 are incorporated in the fixed piece 33 at predetermined intervals and a conductor 311 having a predetermined area is incorporated in moveable piece 31. Accordingly, when the movable piece 31 is not pushed by the SIM card 20, the ground pin 331 and the contact pin 332 are maintained apart from each other. However, when the moveable piece 31 is pushed by a non-cut out corner 21 of the erroneously inserted SIM card, the ground pin 331 and the contact pin 332 of the fixed piece 33 are electrically connected to each other by the conductor 311 of the moveable piece 31. As a result, the SIM card control unit (45 in FIG. 7) of the electronic device 100 recognizes the erroneous insertion of the SIM card 20 and performs a corresponding operation. Although not illustrated in detail, the moveable piece 31 and the fixed piece 33 may be moveable inside or in another embodiment fixed to the electronic device. Specifically, the moveable piece 31 and the fixed piece 33 may be supported by the case frame of the electronic device to be moveable or fixed.

Figure 4A:
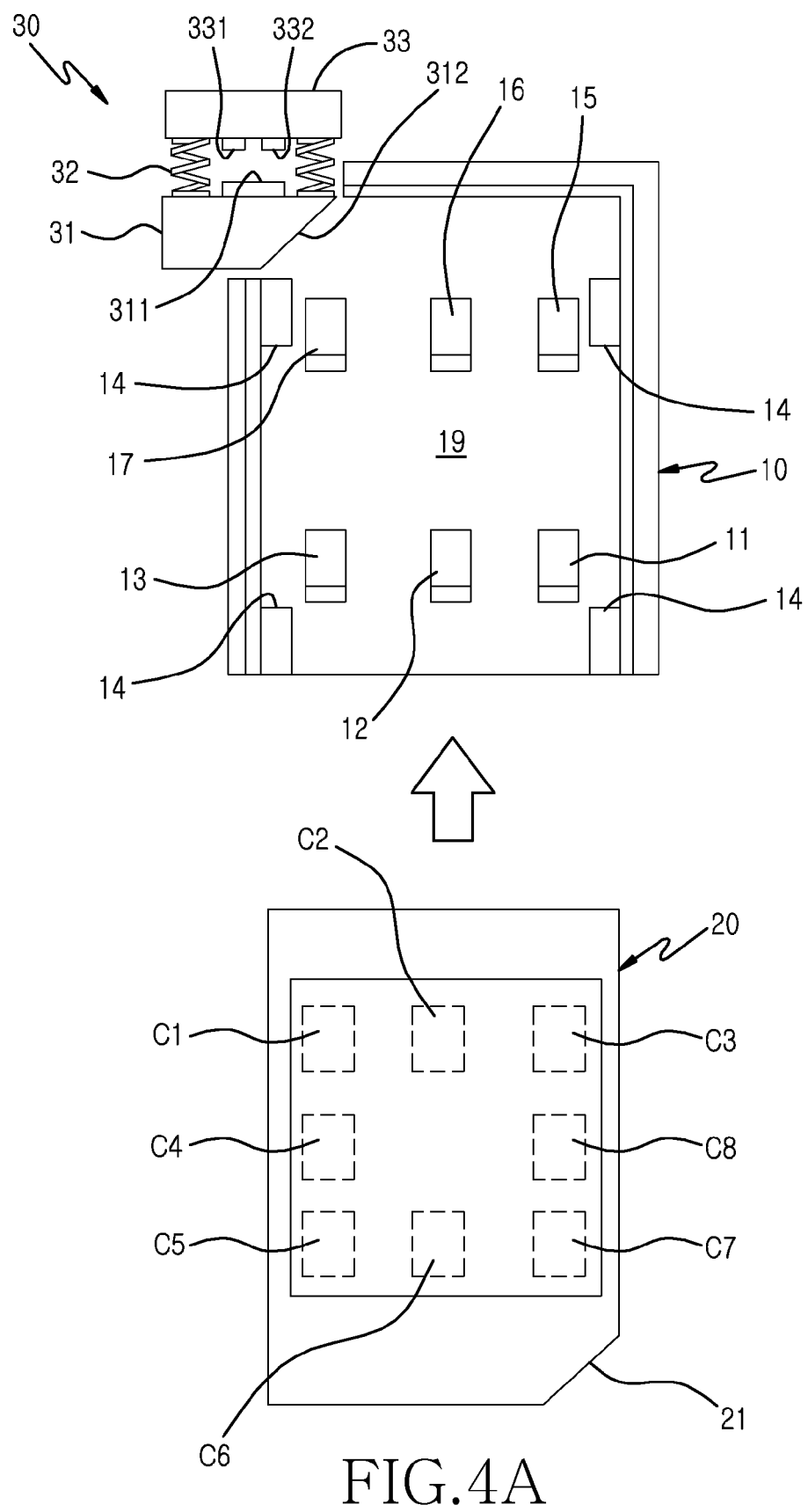
FIGS. 4A and 4B are diagrams illustrating a card erroneously inserted into a socket of the electronic device according to principles of the invention.
Figure 4B:
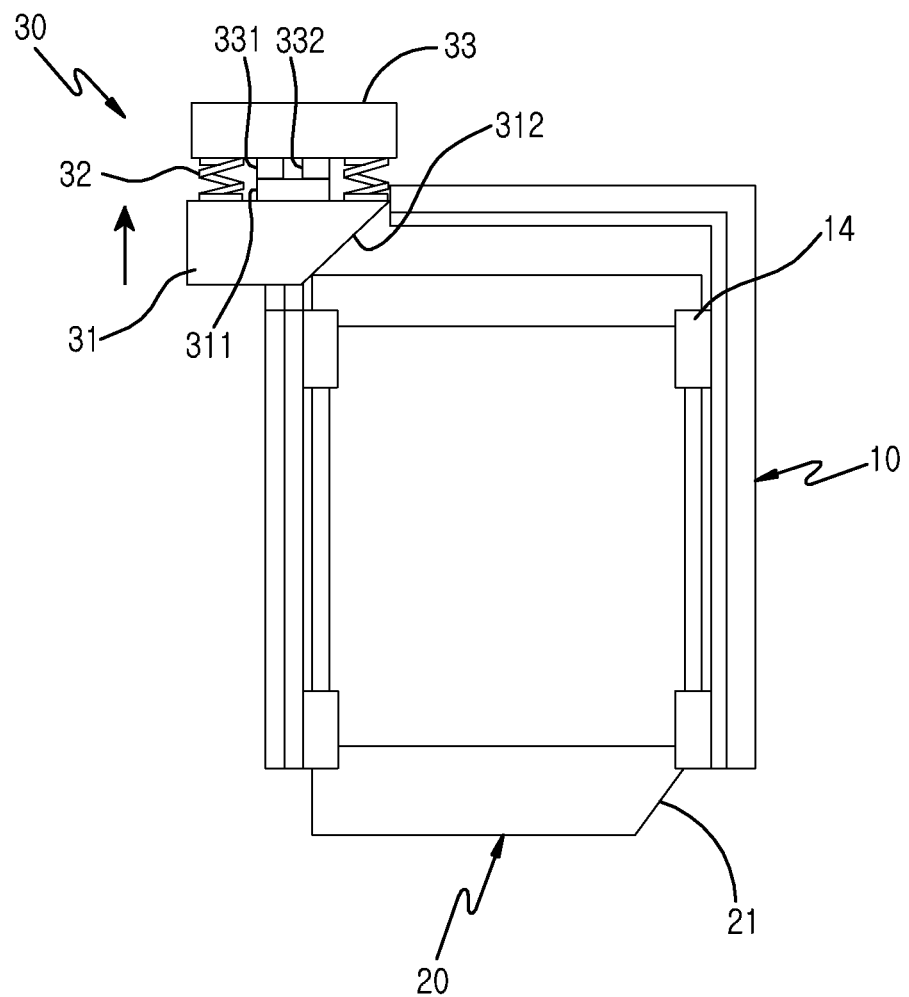
Figure 5:
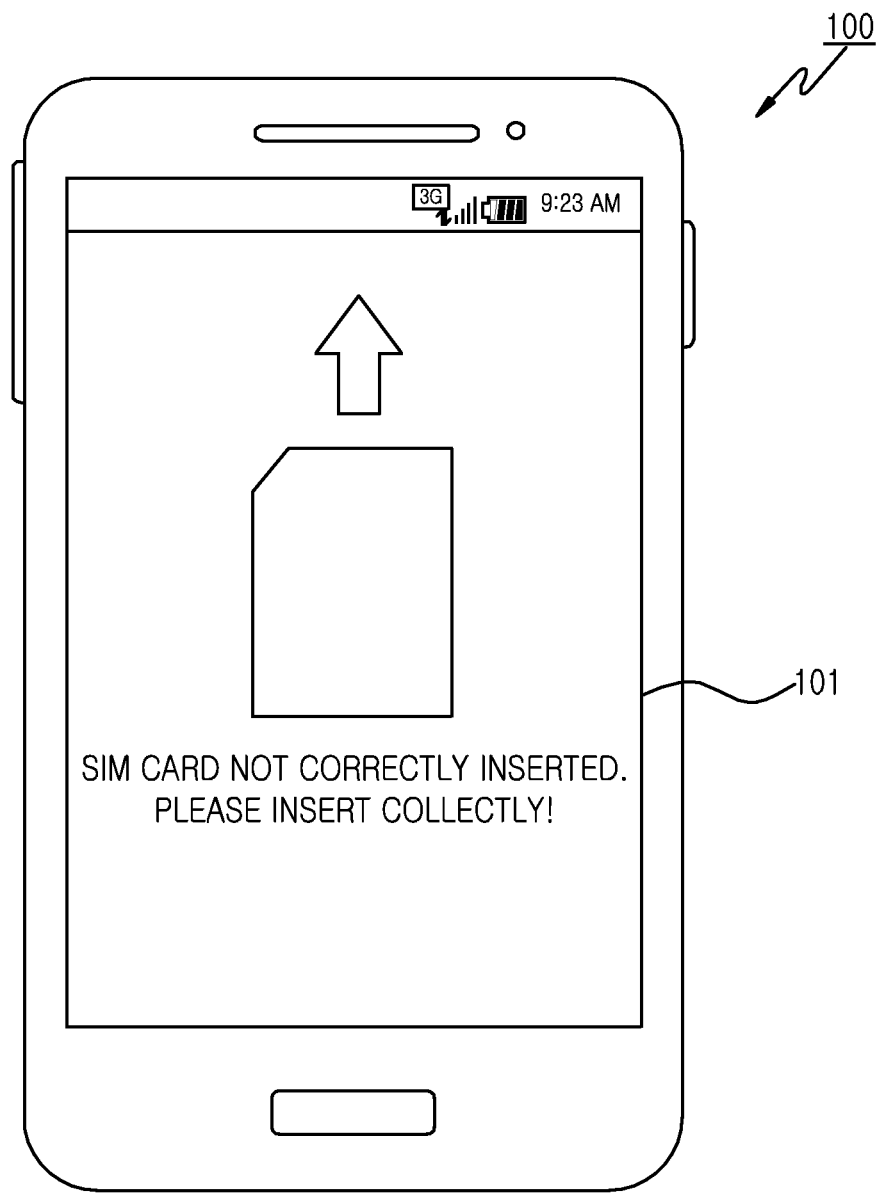
FIG. 5 shows a plan view of an electronic device illustrating a screen indicating to a user a card is erroneously inserted according to principles of the invention.

FIGS. 4A and 4B are diagrams illustrating a card erroneously inserted into a socket of the electronic device. FIG. 5 shows a plan view of an electronic device illustrating a screen indicating to a user a card is erroneously inserted. Referring to FIGS. 4A to 5, when the SIM card 20 is erroneously inserted, the corner that is not the cut-out portion 21 of the SIM card 20 comes into contact with the sloped portion 312 of the movable piece 31. In this state, the SIM card 20 is not completely inserted, and a user continuously inserts the SIM card 20 into the mounting space of the socket 10 in the direction of an arrow in FIG. 4B. Conductor 311 of the moveable piece 31 electrically connects the ground pin 331 of the fixed piece 33 with the contact pin 332, in response device 100 detects the erroneous insertion of the SIM card 20. SIM card control unit 45 (FIG. 7) of the electronic device 100 outputs various messages on the display device 101 of the electronic device 100 in response to the detection signal. Alternatively, a processor module of the electronic device 100 may perform the function of the SIM card control unit 45 without requiring a separate SIM card control unit 45. For example, as illustrated in FIG. 5, a message ("SIM Card Not Correctly Inserted. Please Insert Correctly!") is output to guide the user to re-insert the SIM card in a correct orientation. In other embodiments, the message may be output by different methods. In another embodiment, the functions of the connection terminals 11, 12, 13, 15, 16 and 17 of the socket 10 are switched to facilitate generation of a message indicating that the SIM card 20 is erroneously inserted, and inquiring whether to perform normal operation even though the SIM card is erroneously inserted or to await correct insertion of the SIM card. In another embodiment, when the SIM card 20 is erroneously physically inserted, the SIM card may be caught by the moveable piece 31 preventing complete insertion of the SIM card, thus allowing the user to perceive erroneous insertion and to correctly insert the SIM card.

Figure 6:
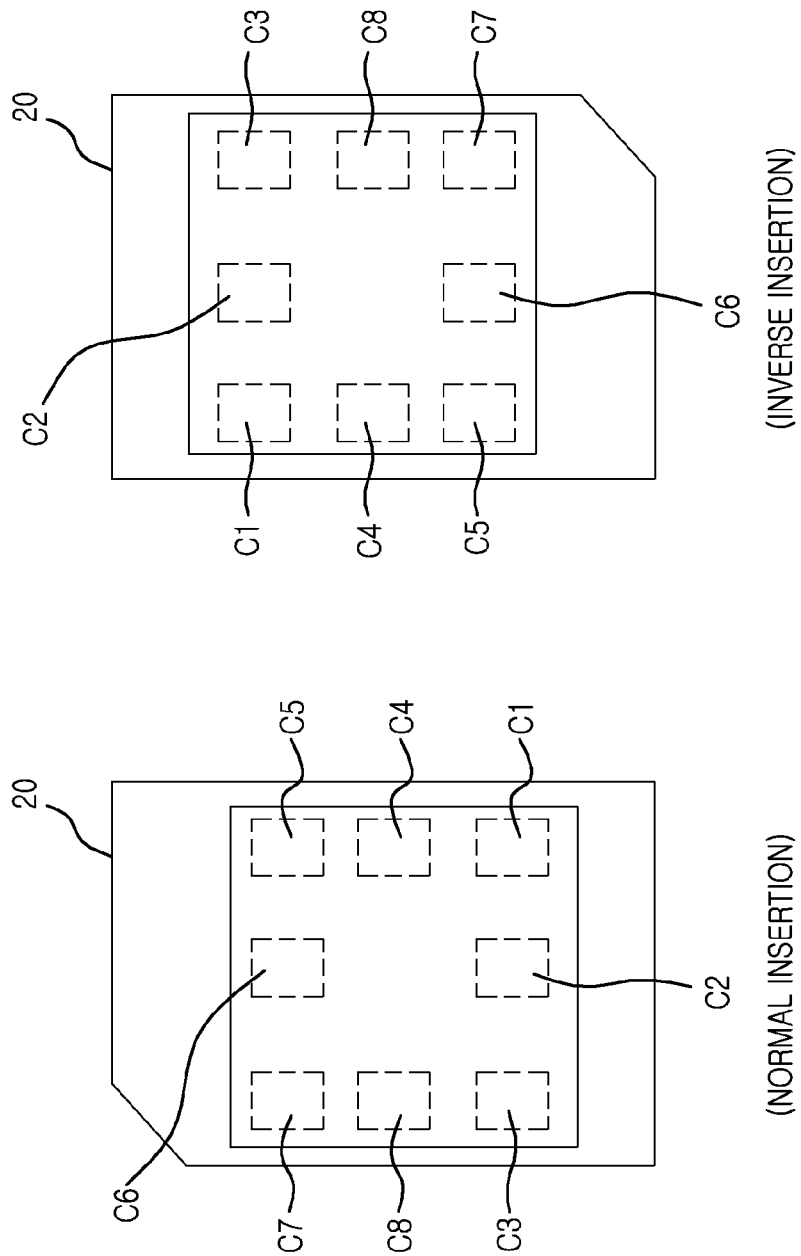
FIG. 6 shows a configuration diagram illustrating comparison of contact pad structures supporting detection of erroneous card insertion according to principles of the invention.
Figure 7:
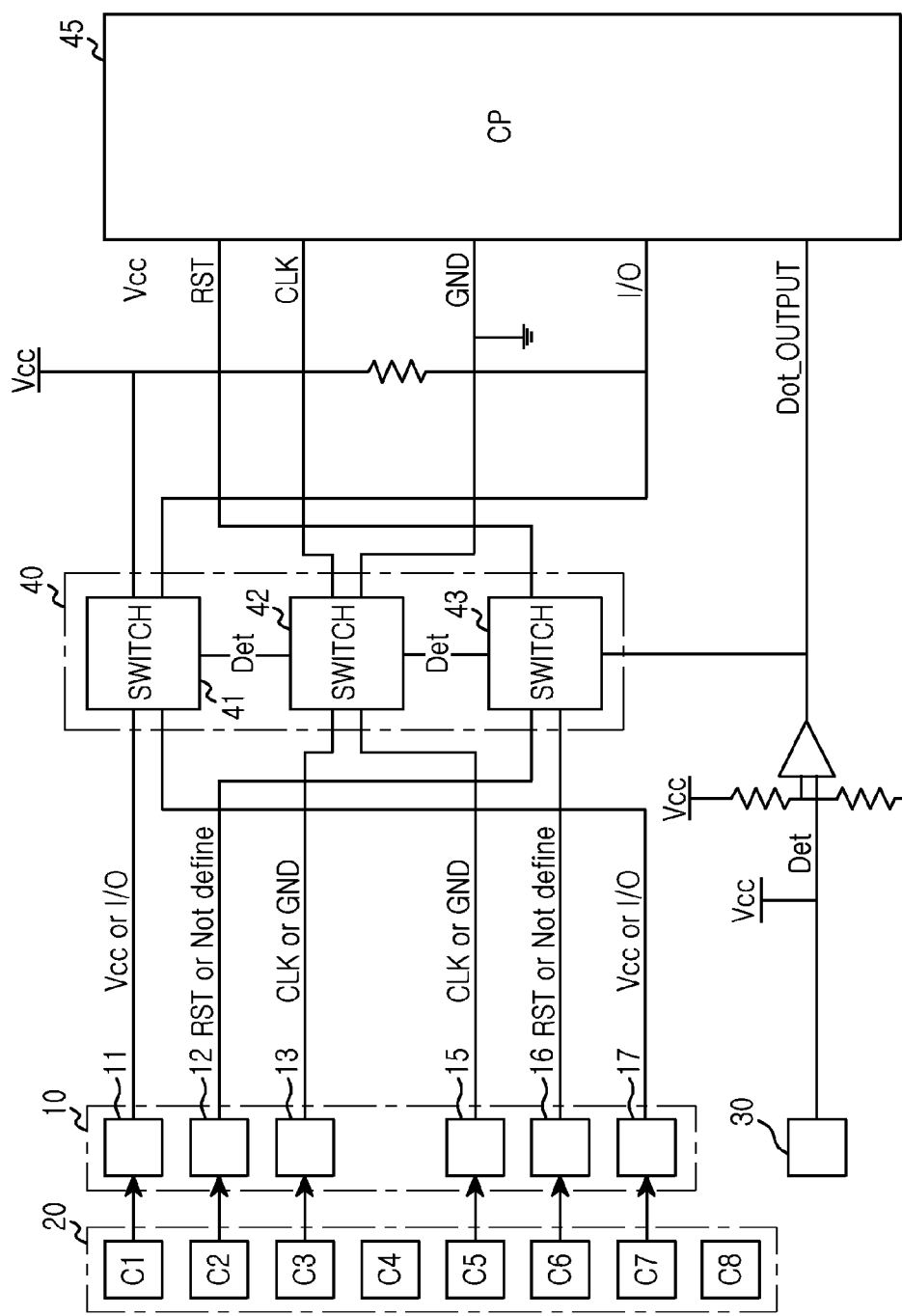
FIG. 7 shows an electronic device system for recognizing erroneous card insertion and switching corresponding connection terminals according to principles of the invention.

FIG. 6 shows a configuration diagram illustrating comparison of contact pad structures supporting detection of erroneous card insertion. FIG. 7 shows an electronic device system for recognizing erroneous card insertion and switching corresponding connection terminals. Referring to FIGS. 6 and 7, when the erroneous insertion of the SIM card 20 is detected by detection unit 30, the processor module or SIM card control unit 45 of the electronic device switches the functions of the connection terminals 11, 12, 13, 15, 16 and 17 of the socket 10 to enable normal operation of the SIM card 20. Even if SIM card 20 is erroneously inserted into the socket 10, the contact pads C1, C2, C3, C4, C5, C6, C7, and C8 exposed outside the SIM card may be connected to the connection terminals 11, 12, 13, 15, 16 and 17 of the socket 10 even though the signals do not correspond to normal signals present on these contact pads upon a correct insertion.

When the SIM card is normally inserted, contact pad VCC C1 of the SIM card corresponds to the first connection terminal 11 of the socket, the contact pad SIM_RST C2 of the SIM card corresponds to the second connection terminal 12 of the socket, the contact pad SIM_CLK C3 of the SIM card corresponds to the third connection terminal 13 of the socket, the contact pad SIM_GND C5 of the SIM card corresponds to the fourth connection terminal 13 of the socket, and the contact pad SIM_IO C7 of the SIM card corresponds to the sixth connection terminal 17 of the socket, thereby supporting normal SIM card operation.

However, when the SIM card is inserted backwards, electrical connection is made such that the contact pad VCC C1 of the SIM card corresponds to the sixth connection terminal 17 of the socket, the contact pad SIM_RST C2 of the SIM card corresponds to the fifth connection terminal 16 of the socket, the contact pad SIM_CLK C3 of the SIM card corresponds to the fourth connection terminal 15 of the socket, the contact pad SIM_GND C5 of the SIM card corresponds to the third connection terminal 13 of the socket, and the contact pad SIM_IO C7 of the SIM card corresponds to the first connection terminal 11 of the socket. Electrical device 100 advantageously includes a separate switching unit 40 for switching the connection terminals of the socket 10 as illustrated in FIG. 7 in response to detection of the erroneous backward insertion of the card.

Referring to FIG. 7, when the SIM card 20 is erroneously inserted, ground pin 331 and contact pin 332 are electrically coupled by the conductor 311, initiating switching of switching devices 41, 42 and 43 of the switching unit 40. Therefore, the first connection terminal 11 and the sixth connection terminals 17 are swapped by the first switching device 41 of the switching unit, the third connection terminal 13 and the fourth connection terminals 15 are swapped by the second switching device 42 of the switching unit, and the second connection terminal 12 and the fifth connection terminals 16 are swapped by the third switching device 43 of the switching unit, thereby advantageously enabling normal operation even when the SIM card is erroneously inserted.

In an embodiment, in response to detection of erroneous insertion by the detection unit 30, ground pin 331 and contact pin 332 are electrically coupled, and switching is automatically made in response to this coupling. However in an embodiment, a SIM card control unit or a processor of the electronic device that receives the detection signal of the SIM card control unit may control the switching unit directly.

Figures 8A, 8B:
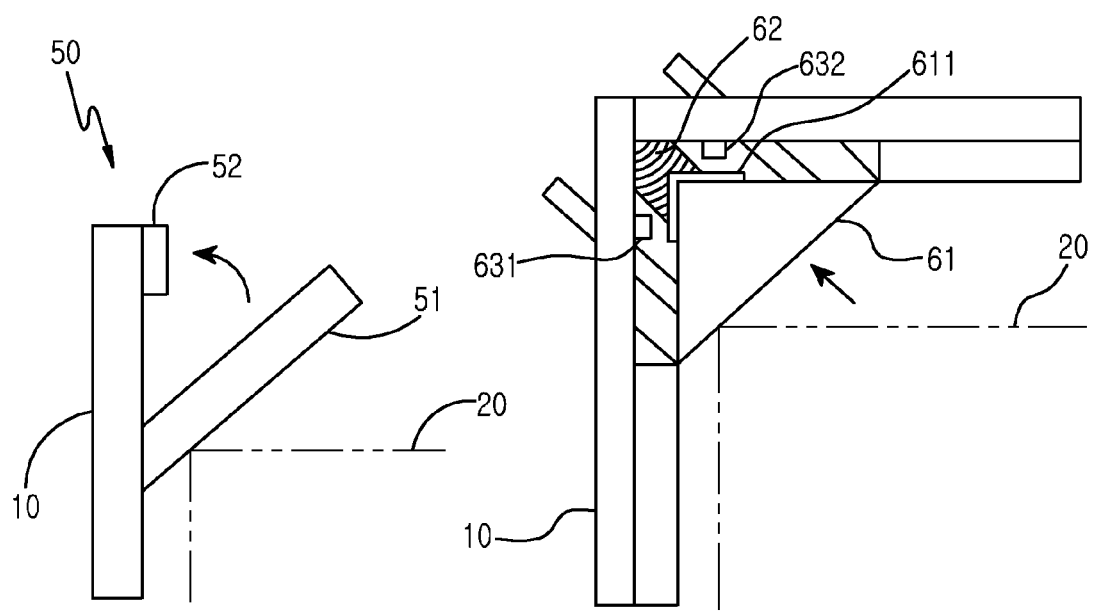
FIGS. 8A and 8B are diagrams illustrating a detection unit for detecting erroneous card insertion according to principles of the invention.

FIGS. 8A and 8B are diagrams illustrating a detection unit for detecting erroneous card insertion. Movable metal rotation piece 51 is incorporated in the card mounting space of the socket 10, and a contact pin 52 is inserted in the wall of the socket 10. When the SIM card 20 is erroneously inserted, the movable metal rotation piece 51 is pushed by the corner of the SIM card to be rotated in the direction of the arrow and is electrically connected to the contact pin 52, initiating detection of the erroneous insertion of the SIM card. Movable member 61 in the corner of the card mounting space is supported by a spring 62, a ground pin 631 and a contact pin 632 are provided in the wall of the socket 10 spaced apart from each other at a predetermined interval, and a conductor 611 is provided on movable member 61. When the SIM card 20 is erroneously inserted, the movable member 61 is pushed in the direction of the arrow by the corner of the SIM card such that pins 631 and 632 become electrically connected providing a detection signal indicating detection of an erroneous insertion of the SIM card.

Different embodiments for detecting the erroneous insertion of the SIM card electrically or mechanically may be used according to invention principles. For example, when the SIM card is normally inserted, at least one photo sensor having a light emitting unit and a light receiving unit may be provided in the card mounting space of the socket permitting reception by the receiving unit of the emitted light via the cut-out portion of the SIM card when the SIM card is normally, correctly inserted. When the SIM card is erroneously inserted, the light emission is blocked by the SIM card corner from being received by the light receiving unit triggering detection of erroneous insertion of the SIM card. A further photo sensor for checking the mounting of the SIM card may be further provided in addition to the above-described photo sensor regardless of the erroneous insertion of the SIM card. The processor of the electronic device in one embodiment determines that the SIM card is inserted in the socket by using a single photo sensor and light emitter and detects whether the SIM card is erroneously inserted using a second photo sensor and light emitter.

Figure 9:
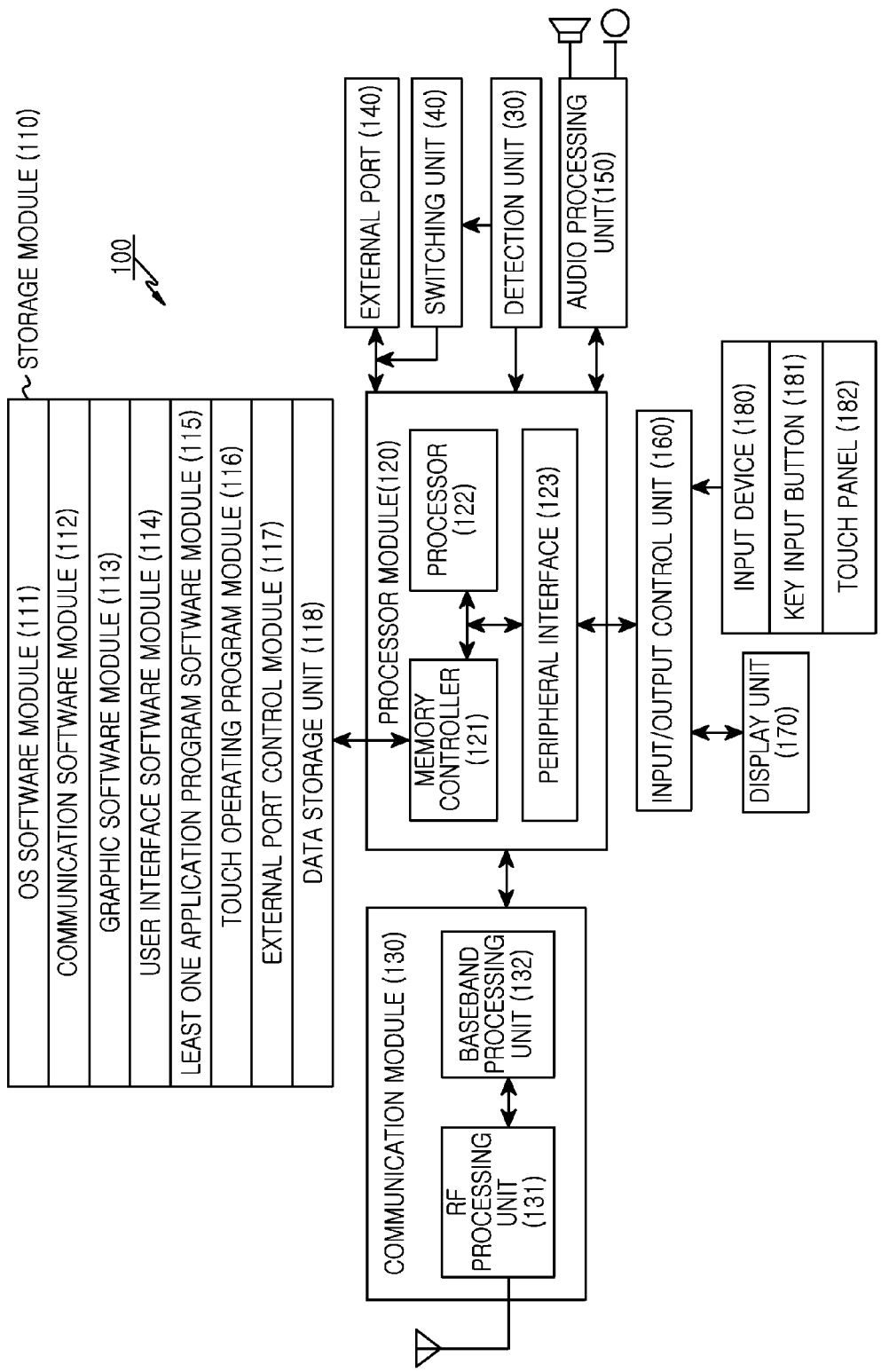
FIG. 9 shows a block configuration diagram of an electronic device according to principles of the invention.

FIG. 9 shows a block configuration diagram of an electronic device including a storage module 110, a processor module 120, a communication module 130, an external port 140, a switching unit 40, a detection unit 30, an audio processing unit 150, an input/output control module 160, a display unit 170, and an input device 180. The storage module 110 and the external port 140 may comprise a plurality of units, and the display unit 170 may include an LCD module as a display module. The processor module 120 includes a memory controller 121, at least one processor 122, and a peripheral interface 123. Herein, the processor module 120 will also be referred to as a processor. The communication module 130 includes a radio frequency (RF) processor 131 and a base band processor 132.

The storage module 110 includes a program storage unit for storing a program for controlling an operation of the electronic device 100, and a data storage unit 118 for storing data generated during the execution of a program. For example, the program storage unit includes an operating system (OS) software module 111, a communication software module 112, a graphic software module 113, a user interface software module 114, at least one application program software module 115, a touch screen operating program module 116, and an external port control module 117. The OS software module 111 includes at least one software component for controlling general system operations and enabling smooth communication between various hardware components (devices) and software components. The communication software module 112 includes at least one software component for processing data transmitted and received through the RF processing unit 131 or the external port 140. The graphic software module 113 includes at least one software component for providing and displaying graphics on the display unit 170. The UI software module 114 includes at least one software component related to a user interface. The application program software module 115 includes a software component for at least one application program installed in the portable electronic device 100.

The touch screen operating program module 116 includes a software component for correcting touch errors recognized by a touch panel IC and a pen touch panel IC which are included in the input/output control module 160. The external port control module 117 includes a component for displaying a message indicating erroneous insertion of a SIM card upon erroneous insertion detection by the detection unit 30 under the control of the processor module 120. The memory controller 121 of the processor module 120 controls access to the storage module 110 of other components, such as the processor 122 or the peripheral interface 123, and switches the functions of connection terminals within a socket by controlling a switching unit when the erroneous insertion of the SIM card 20 is detected. The peripheral interface 123 controls connections of the input/output peripherals of the electronic device 100 to processor 122 and the storage module 110. The processor 122 supports services, such as voice communication and data communication, by using at least one software program. In addition, the processor 122 executes software modules stored in the storage module 110 to provide multimedia services of the software modules.

The memory controller 121, the processor 122, and the peripheral interface 123 included in the processor module 120 may be implemented by a single integrated circuit (IC) or separate integrated circuits. The FRO processing unit 131 of the communication module 130 processes RF signals transmitted and received through an antenna. For example, the RF processing unit 131 converts baseband signals received from the baseband processing unit 132 into RF signals and transmits the RF signals through the antenna. In addition, the RF processing unit 131 converts RF signals received through the antenna into baseband signals and transmits the baseband signals to the baseband processing unit 132. Herein, the RF processing unit 131 may include an RF transceiver, an amplifier, a tuner, an oscillator, a digital signal processor, a CODEC (COding DECoding) chip set, and a Subscriber Identity Module (SIM) card.

The external port 140 includes a connection interface enabling the electronic device to connect to another external device directly or to connect to another device through a network. For example, the external port 140 includes a charge interface for charging the electronic device, and a socket for accommodating a card-type external device according to the present invention. Such a socket may include a plurality of connection terminals for electrical connection corresponding to a plurality of contact pads included in the card-type external device. The switching unit 40 in one embodiment switches between different signals received by a plurality of connection terminals included in the socket in response to erroneous card insertion detection by detection unit 30 or in response to control by the processor module 120. Specifically unit 40 switches between individual pairs of signals to provide one of the pair as output in response to erroneous card insertion detection. An individual signal pair comprises two signals from two different corresponding contact pads of socket 10 as described in connection with FIG. 7. The switching unit comprises a plurality of switching devices 41, 42, and 43.

In an embodiment, detection unit 30 configuration pin 331 and contact pin 332 are provided in the fixed piece 33 and are electrically connected to each other by the conductor 311 provided in the movable piece 31. Alternatively, the detection unit 30 comprises a photo sensor having a known light emitting unit and a known light receiving unit that detect erroneous insertion as previously described. The audio processing unit 150 forms audio packets and provides an audio interface between a user and the portable electronic device 100 through a speaker and a microphone. The input/output control module 160 provides an interface between the display unit 170 including a display module, the input/output device, such as a key input button 181 and a touch panel 182, and the peripheral interface 123. The input/output control module 160 includes a driver IC for determining a touch coordinate according to input information received from a touch panel.

The display unit 170 displays state information indicating status of the electronic device 100, characters input by the user, moving pictures and still pictures, for example, in response to control of the graphic software module 113. In addition, the display unit 170 presents an error message to the user indicating a substantially immediate detection of erroneous insertion of a card enabling a user to ensure normal operation, improving reliability of the electronic device.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and differences within the scope are to be construed as being included in the present invention. For example, although a SIM card having eight contact pads and a socket having six connection terminals are described above, the present invention is not limited thereto. For example, various card-type devices may be used in addition to the SIM card including less than or more than eight contact pads. Various sockets corresponding thereto, or connection terminals provided directly in the PCB of the electronic device may be applicable.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. An electronic device comprising:
    a socket provided within the electronic device for receiving a card-type external device having a cut-out portion formed in a corner of the card-type external device;
    a detection unit for detecting erroneous insertion of the card-type external device in the socket, wherein external device wherein the detection unit includes: (i) a movable piece occupying the cut-out portion when the card-type external device is correctly inserted into the socket, and (ii) a fixed piece that electrically couples to the movable piece when the card-type external device is erroneously inserted into the socket; and
    a control unit configured to output a control signal in response to the fixed piece electrically coupling with the movable piece.

2. The electronic device of claim 1, wherein the fixed piece is spaced apart from the movable piece, and the detection unit further comprises an elastic member configured to support the movable piece when the movable piece occupies the cut-out portion.

3. The electronic device of claim 2, wherein the movable piece is provided with a conductor,
    the fixed piece is provided with a first terminal and a second terminal spaced apart from each other, and
    the first terminal and the second terminal are electrically connected to each other by the fixed piece when the movable piece is pushed into the fixed piece.

4. The electronic device of claim 3, wherein the movable piece is pushed into the fixed piece when the card-type external device is erroneously inserted into the socket.

5. The electronic device of claim 1, further comprising a display device for outputting an error message in response to the card-type external device being erroneously inserted into the socket.

6. The electronic device of claim 5, wherein the error message identifies a correct way for inserting the card-type external device into the socket.

7. The electronic device of claim 1, further comprising a switch configured to electrically decouple a first terminal of the socket from a first terminal of the control unit and electrically couple the first terminal of the socket to a second terminal of the control unit when the card-type external device is erroneously inserted into the socket.

8. The electronic device of claim 7, wherein the switch is configured to electrically decouple the first terminal of the socket from the first terminal of the control unit in response to the control signal.

9. The electronic device of claim 1, wherein the card-type external device is a Subscriber Identification Module (SIM) card or a memory card.

10. The electronic device of claim 1, wherein the electronic device comprises a mobile communication terminal.

11. An electronic device comprising:
a socket provided within the electronic device for receiving a card-type external device having a cut-out portion formed in a corner of the card-type external device;
a detection unit for detecting erroneous insertion of the card-type external device into the socket according to incorrect location of the cut-out portion during insertion of the card-type external device; and
a processor for outputting a control signal in response to the erroneous insertion of the card-type external device;
wherein the detection unit comprises at least one photo sensor performing detection by using the cut-out portion of the card-type external device to pass light for correct insertion detection.

12. The electronic device of claim 11, comprising a first photo sensor for detecting whether there is a cut-out portion and a second photo sensor for detecting whether the card-type external device is inserted.

13. A method for detecting erroneous insertion of a card-type external device into a socket of an electronic device, comprising:
detecting that the card-type external device is erroneously inserted in the socket; and
in response to detecting that the card-type external device is erroneously inserted, electrically decoupling a first terminal of the socket from a first terminal of a control unit and electrically coupling the first terminal of the socket to a second terminal of the control unit.

14. The method of claim 13, further comprising outputting an error message in response to detecting that the card-type external device is erroneously inserted.

15. The method of claim 13, further comprising detecting whether the card-type external device is usable without correctly inserting the card-type external device in the socket, wherein the first terminal of the socket is electrically decoupled from the first terminal of the control unit and electrically coupled to the second terminal of the control unit in response to detecting that the card-type external device is usable without correctly inserting the card-type external device in the socket.

16. The method of claim 13, wherein the card-type external device is a Subscriber Identification Module (SIM) card or a memory card.

17. The method of claim 13, wherein the detecting whether the card-type external device is erroneously inserted is performed using a detection unit for detecting erroneous insertion of the card-type external device in the socket, wherein the detection unit includes: (i) a movable piece occupying a cut-out portion of the card-type external device when the card-type external device is correctly inserted into the socket, and (ii) a fixed piece that electrically couples with the movable piece when the card-type external device is erroneously inserted into the socket.

18. A method for detecting erroneous insertion of a card-type external device into a socket of an electronic device, comprising:
detecting that the card-type external device is erroneously inserted in the socket; and
in response to detecting that the card-type external device is erroneously inserted, swapping a first terminal of the socket with a second terminal of the socket, the swapping including: (i) electrically decoupling the first terminal of the socket from a first terminal of a control unit and electrically coupling the first terminal of the socket to a second terminal of the control unit, and (ii) electrically decoupling the second terminal of the socket from the second terminal of the control unit and electrically coupling the second terminal of the socket to the first terminal of the control unit.

19. The method of claim 18, wherein the card-type external device comprises a Subscriber Identification Module (SIM) card or a memory card.

20. The method of claim 18, wherein the detecting whether the card-type external device is erroneously inserted is performed using a detection unit for detecting erroneous insertion of the card-type external device in the socket, wherein the detection unit includes: (i) a movable piece occupying a cut-out portion of the card-type external device when the card-type external device is correctly inserted into the socket, and (ii) a fixed piece that electrically couples with the movable piece when the card-type external device is erroneously inserted into the socket.

* * * * *

UNITED STATES PATENT AND TRADEMARK OFFICE
CERTIFICATE OF CORRECTION

PATENT NO.        : 9,038,902 B2  
APPLICATION NO.   : 14/091557  
DATED             : May 26, 2015  
INVENTOR(S)       : Yong-Sang Yun Page 1 of 1

It is certified that error appears in the above-identified patent and that said Letters Patent is hereby corrected as shown below:

In the Claims

Column 10, Claim 1, Lines 36-37 should read as follows:
--...socket, wherein the detection...--

Signed and Sealed this  
First Day of September, 2015

Michelle K. Lee  
*Director of the United States Patent and Trademark Office*